US010330231B2

(12) United States Patent
Meissner

(10) Patent No.: US 10,330,231 B2
(45) Date of Patent: Jun. 25, 2019

(54) ARRANGEMENT FOR PRODUCING A PIPE CONNECTION AND HOLDING ELEMENT FOR SUCH AN ARRANGEMENT

(71) Applicant: Viega Technology GmbH & Co. KG, Attendorn (DE)

(72) Inventor: Kai-Michael Meissner, Kreuztal (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 15/270,056

(22) Filed: Sep. 20, 2016

(65) Prior Publication Data

US 2017/0082229 A1 Mar. 23, 2017

(30) Foreign Application Priority Data

Sep. 21, 2015 (DE) .................. 10 2015 115 890

(51) Int. Cl.
*F16L 37/091* (2006.01)
*F16L 47/08* (2006.01)
*F16L 19/08* (2006.01)

(52) U.S. Cl.
CPC ............. *F16L 37/091* (2013.01); *F16L 19/08* (2013.01); *F16L 47/08* (2013.01)

(58) Field of Classification Search
CPC ......... F16L 19/065; F16L 19/08; F16L 19/12; F16L 19/106; F16L 37/091; F16L 37/092; F16L 47/08; F16L 47/12
USPC .... 285/340, 342, 354, 377, 247, 391, 36, 34
See application file for complete search history.

(56) References Cited

U.S. PATENT DOCUMENTS

| | | | | |
|---|---|---|---|---|
| 419,988 A * | 1/1890 | Davis | ..................... | F16L 33/213 285/258 |
| 1,311,145 A * | 7/1919 | Zeindler et al. | ...... | F16L 37/252 285/27 |
| 2,437,632 A * | 3/1948 | Wolfram | .................. | F16L 19/08 220/319 |
| 3,006,003 A * | 10/1961 | Johnson, Jr. | ........... | B21D 53/24 29/510 |
| 3,229,743 A * | 1/1966 | Derby | ................... | F16B 37/041 411/175 |
| 3,540,762 A * | 11/1970 | Dunlap | .................. | F16L 37/105 285/391 |
| 4,335,753 A * | 6/1982 | Frye | ........................ | F16L 33/24 138/109 |

(Continued)

FOREIGN PATENT DOCUMENTS

DE 3112255 A1 4/1982
EP 2282102 A2 2/2011

*Primary Examiner* — Aaron M Dunwoody
(74) *Attorney, Agent, or Firm* — The Webb Law Firm

(57) ABSTRACT

A pipe connection assembly having a fitting, an end section of the fitting for receiving a pipe end, a sealing ring, a separating ring, a cutting ring and a holding element, wherein the fitting has an inner section with an inner diameter adapted to the outer diameter of the pipe end to be received, wherein the end section has an inner contour tapered in sections starting from the distal end, wherein the sealing ring, the separating ring and the cutting ring are arranged such that they are axially movable inside the end section of the fitting, and wherein the holding element has an inner thread for screwing onto an outer thread formed on the fitting and a stop element protruding inwards for abutment against the arrangement of the sealing ring, the separating ring and the cutting ring.

10 Claims, 4 Drawing Sheets

(56) References Cited

U.S. PATENT DOCUMENTS

| | | | | |
|---|---|---|---|---|
| 4,431,216 A | | 2/1984 | Legris | |
| 4,964,657 A | * | 10/1990 | Gonzales | F16L 19/086 |
| | | | | 285/332 |
| 5,139,380 A | * | 8/1992 | Reynolds | B21D 53/24 |
| | | | | 411/437 |
| 5,466,019 A | * | 11/1995 | Komolrochanaporn | |
| | | | | F16L 19/12 |
| | | | | 285/339 |
| 5,957,509 A | * | 9/1999 | Komolrochanaporn | |
| | | | | F16L 19/12 |
| | | | | 285/343 |
| 2012/0175874 A1 | * | 7/2012 | Newall | F16L 19/086 |
| | | | | 285/389 |
| 2012/0326439 A1 | * | 12/2012 | Bogert | F16L 19/10 |
| | | | | 285/354 |

* cited by examiner

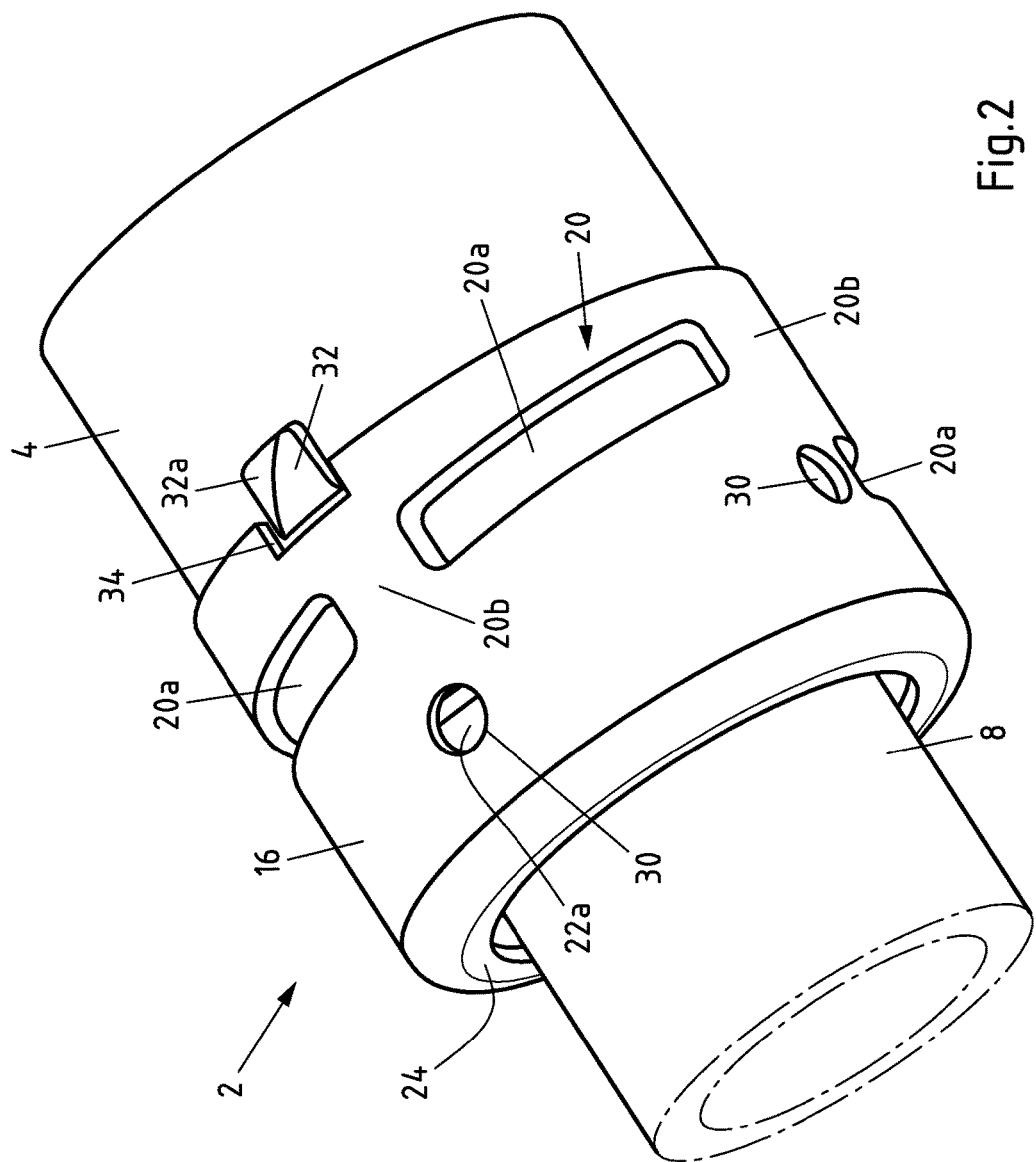

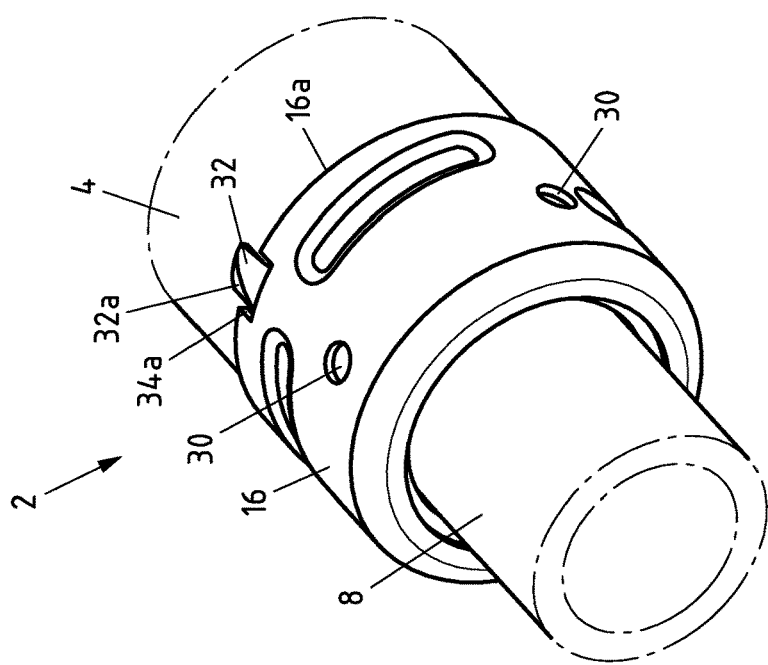
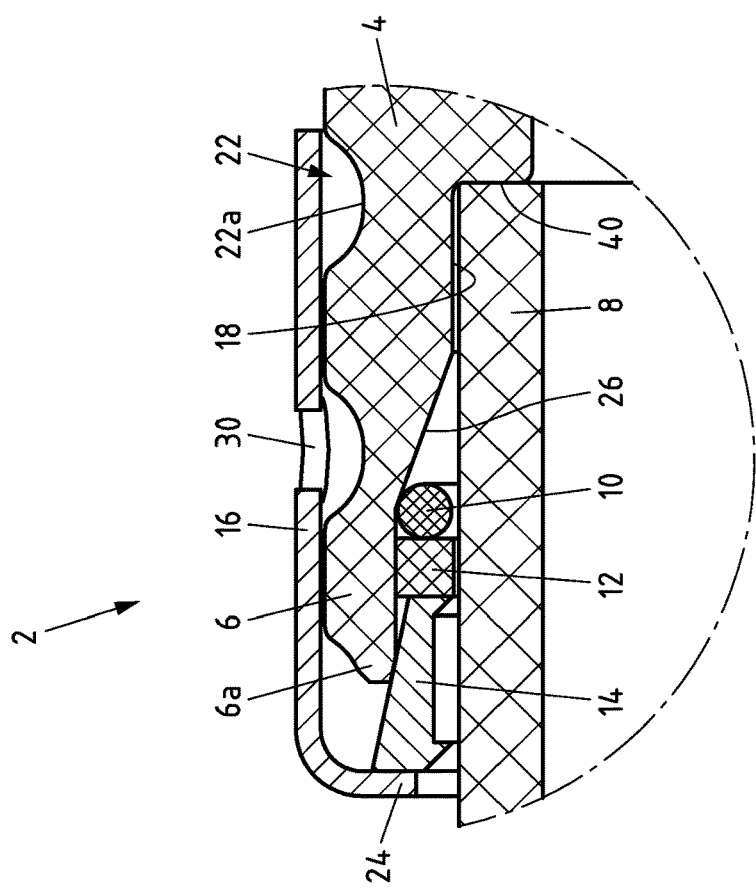

ARRANGEMENT FOR PRODUCING A PIPE CONNECTION AND HOLDING ELEMENT FOR SUCH AN ARRANGEMENT

CROSS-REFERENCE TO RELATED APPLICATION

This application claims priority to German Patent Application No. 10 2015 115 890.6 filed Sep. 21, 2015, the disclosure of which is hereby incorporated in its entirety by reference.

BACKGROUND OF THE INVENTION

Field of the Invention

The invention relates to an arrangement for producing a pipe connection, having a fitting, having an end section of the fitting for receiving a pipe end, having a sealing ring, having a separating ring, having a cutting ring and having a holding element, wherein the fitting has an inner section with an inner diameter adapted to the outer diameter of the pipe end to be received, wherein the end section has an inner contour tapered in sections starting from the distal end, wherein the sealing ring, the separating ring and the cutting ring are arranged such that they are axially movable inside the end section of the fitting, and wherein the holding element has an inner thread for screwing onto an outer thread formed on the fitting and a stop element protruding inwards for abutment against the arrangement of the sealing ring, the separating ring and the cutting ring. The invention also relates to a holding element of the previously described type.

Description of Related Art

From the prior art, such arrangements for producing a pipe connection are predominantly known for pipes consisting of plastic, but such an arrangement can also be applied for pipes consisting of metal or of a composite material.

In a known manner, the holding element, which basically can also be referred to as a union nut, consists of a turned metallic nut which is produced from bars or consists of pressed parts. In addition, nuts consisting of plastic are also known. However, in the case of the holding elements mentioned, the problem is that production is complex and the wall thicknesses of the holding element resulting in the process are considerable. In addition, the threads of the known holding elements have a small pitch, so that for connection the holding element has to be rotated many times about its own axis.

Therefore, the invention is based on the technical problem of simplifying the arrangement mentioned at the outset for producing a pipe connection and the mentioned holding element in terms of production and handling.

SUMMARY OF THE INVENTION

The previously mentioned technical problem for an arrangement for producing a pipe connection described at the outset and for a holding element is solved according to the invention in that the holding element is produced by forming from a metal sheet. Hence, the holding element can be produced cost-effectively as a simple formed part and nonetheless has sufficient strength to produce a durable connection between a pipe and the fitting.

The wall thickness of the holding element is preferably between 0.5 and 2.0 mm, preferentially between 0.7 and 1.2 mm, but the wall thickness, particularly when a soft metal is used for producing the holding element, can be up to 5 mm.

Furthermore, the material of the holding element preferably consists of structural steel, stainless steel, high-grade steel, copper, aluminium or brass. Basically, the holding element can consist of any metal, from which a formable metal sheet can be produced.

In addition, the inner thread of the holding element is at least in sections formed as a circumferential indentation protruding inwards and the outer thread of the fitting is formed as a circumferential indentation. In this way, both circumferential indentations jointly serve as a thread, by means of which the holding element can be screwed onto the fitting. If at the same time the indentation protruding inwards is only formed in sections in the holding element and between individual sections the otherwise cylindrical shape of the holding element is maintained, then the holding element exhibits a greater resistance to deformation.

Preferably, the indentations forming the thread are relatively wide in the axial direction, so that one winding is already sufficient to form a firm threaded connection between the holding element and the fitting. Preferably, the axial width of the indentations is more than 1 mm, preferentially more than 2 mm.

Therefore, the thread can be formed with a large pitch, for example the pitch of the thread of the holding element can be steep enough such that starting from a contact position after a rotation by 180°, preferably by 135°, in particular by 90°, the axial movement of the arrangement consisting of the sealing ring, the separating ring and the cutting ring is sufficient for a tight and stable connection to be produced between the pipe end and the fitting.

In order to mount the holding element easily on the fitting and in order to avoid the formation of a multiple-edged profile, the holding element preferably has at least one opening, preferably four openings, for attaching a tool, in particular a hook wrench. In this way, a pattern of openings is formed, by means of which the holding element can be turned by a rotation, for example, by 90° or 180°.

Advantageously, the at least one opening is, preferably all openings are, arranged overlapping with a section of the outer thread of the fitting when the holding element is screwed on. As a result, particularly with regard to the narrow wall thickness of the holding element, the tool can be inserted with more depth and hence the holding element can be mounted more securely.

Preferably, at least one latching nose is arranged on the outside of the fitting and at least one recess is arranged on the side of the holding element opposite the stop element, in order to define a suitable end position when screwing the holding element onto the fitting. In this way, the at least one latching nose and the at least one recess can be brought into engagement with one another when the holding element is fully screwed on. As a result, not only is the end position defined, but also the screwed-on holding element is secure against accidental twisting. Thus, the described screw connection essentially corresponds to a bayonet locking device with latching which, in contrast to a screw connection known from the prior art with a small pitch and many windings, can be easily produced.

BRIEF DESCRIPTION OF THE DRAWINGS

The invention is explained below by means of exemplary embodiments with reference to the figures FIG. 2 shows the arrangement illustrated in FIG. 1 in a perspective view, FIG. 3 shows a section of a further exemplary embodiment of an arrangement according to the invention in the pre-assembled starting position in cross-section, FIG. 4 shows the arrangement from FIG. 3 in a perspective view.

DESCRIPTION OF THE INVENTION

In the following description of the different exemplary embodiments according to the invention, the same components are given the same reference symbols even if the components in the different exemplary embodiments can have differences in terms of their size or shape.

Figure 1:
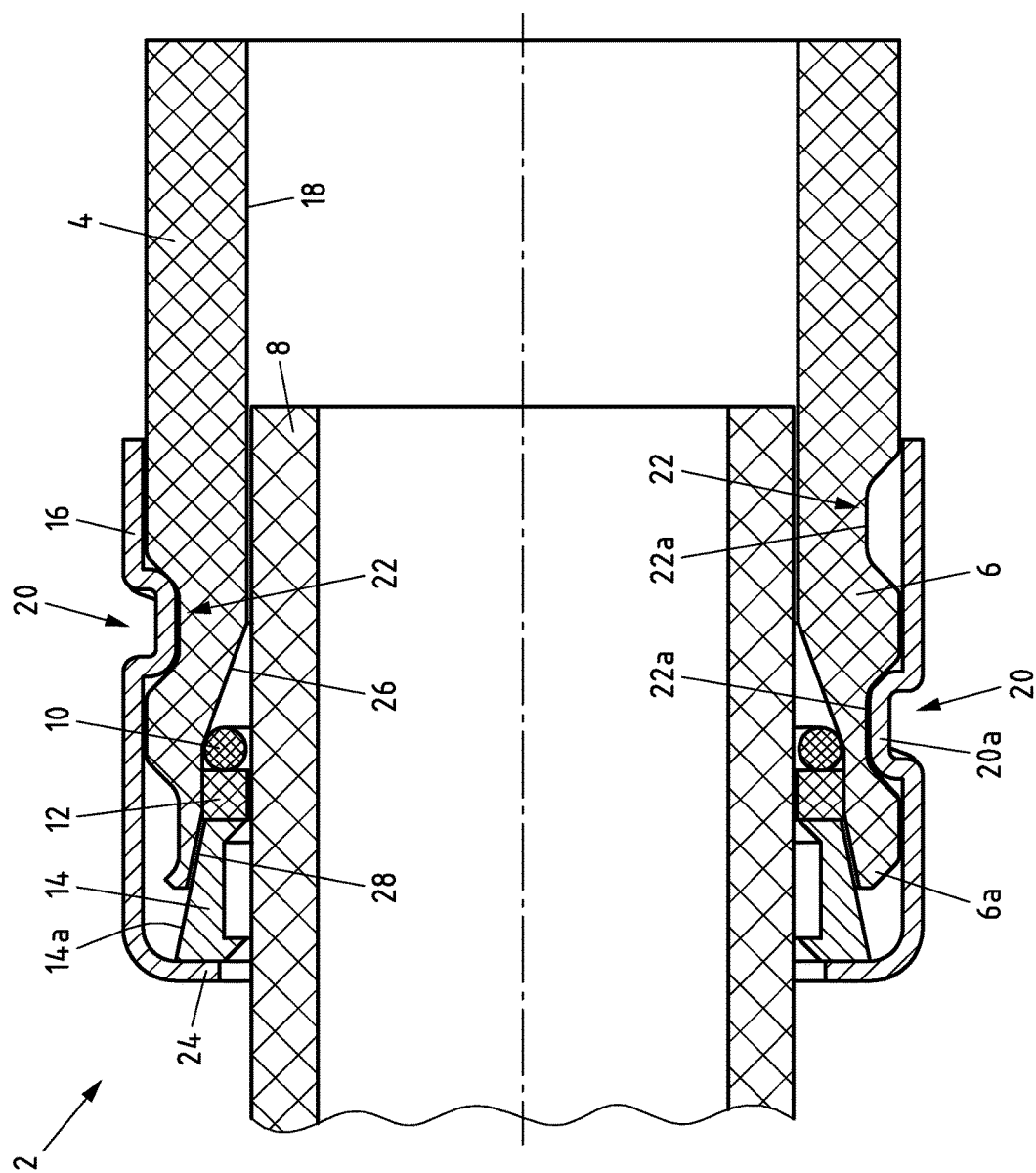
FIG. 1 shows an exemplary embodiment of an arrangement according to the invention for producing a pipe connection in cross-section in a first screwed-on but not yet pressed position.

FIG. 1 shows an arrangement 2 according to the invention for producing a pipe connection. This arrangement, on the one hand, has a fitting 4, an end section 6 of the fitting 4 for receiving a pipe end 8 and a sealing ring 10, a separating ring 12 and a cutting ring 14. On the other hand, a holding element 16 is provided, which by screwing onto the fitting 4 can produce a tight and firm connection between the pipe end 8 and the fitting 4.

For this purpose, the fitting 4 has an inner section 18 having an inner diameter adapted to the outer diameter of the pipe end 8 to be received and the end section 6 is provided with an inner contour tapered in sections starting from the distal end 6a. The sealing ring 10, the separating ring 12 and the cutting ring 14 are arranged such that they are axially movable inside the end section 6 and preferably in the unpressed state abut against one another.

The holding element 16 has an inner thread 20 for screwing onto an outer thread 22 formed on the fitting 4 and a stop element 24 protruding inwards for abutment against the arrangement of the sealing ring 10, the separating ring 12 and the cutting ring 14.

According to the invention, the holding element 16 is produced by forming from a metal sheet. Consequently, the holding element 16 only has a narrow thickness, but can nonetheless have sufficient strength to guarantee a durable and tight connection between the pipe end 8 and the fitting 4. The described arrangement can be used to connect pipes consisting of metal, plastic or of a composite material to a consisting of a hard material such as metal or a hard plastic material.

The wall thickness of the holding element 16 is between 0.5 and 2.0 mm, preferably between 0.7 and 1.2 mm. The material costs for producing the holding element 16 are therefore low. Structural steel, stainless steel, high-grade steel, copper or brass, for example, are possible as materials for the holding element 16. The holding element 16 can basically be produced from any metal for formable sheets. Therefore, a cylindrical pipe section can be used from the formable metal sheet as the starting product, which is formed into the illustrated holding element 16 in the conventional way.

As FIG. 1 shows, the inner thread 20 of the holding element 16 is at least in sections formed as a circumferential indentation 20a protruding inwards and the outer thread 22 of the fitting 4 is formed as a circumferential indentation 22a. The indentations have an axial width of more than 1 mm, preferably of more than 2 mm. As a consequence, the thread 20, 22 can have a large pitch.

In this exemplary embodiment, the indentation 20a overall only runs over one angle range of a rotation and therefore, in principle, the inner thread 20 only has one winding. In addition, the indentation 20a is interrupted in a plurality of sections, between which the cylindrical material of the holding element 16 remains as sections 20b. The holding element 16 retains a more stable form compared to a continuous indentation 20a as a result of the sections 20b.

In this exemplary embodiment, the pitch of the thread 20, 22 is steep enough such that after a rotation by approximately 90°, the axial movement of the arrangement of the sealing ring 10, the separating ring 12 and the cutting ring 14 is sufficient for a tight and stable connection to be produced between the pipe end 8 and the fitting 4. The axial movement is exerted by the stop element 24 which, when the holding element 16 is being screwed on, moves the arrangement of the sealing ring 10, the separating ring 12 and the cutting ring 14 axially towards the fitting 4.

In addition, the inner contour of the fitting 4 has two conically inwardly running sections 26 and 28 which during the axial movement of the holding element 16 caused by the screwing on lead to a radial pressing of the three elements sealing ring 10, separating ring 12 and cutting ring 14. Since the cutting ring 14 has a conical outer contour 14a, the outer contour 14a slides on the surface of the conical section 28 during the axial movement, as is described in more detail further below.

FIG. 2 shows two more preferred features of the described arrangement 2.

On the one hand, the holding element 16 has four openings 30 for attaching a hook wrench, which are arranged in a pattern at a distance of 90° peripherally in the holding element 16. In particular, the openings 30 are positioned peripherally on the holding element 16 where the sections 20b of the inner thread 20 are also arranged axially offset.

In the present case, the openings 30 are formed as round drill holes, but can have another cross-section. By attaching the easy to handle hook wrench, the holding element 16 can be rotated by the required angle of, for example, 90°, so that due to the steep thread, of which only the inner thread 20 can be identified in FIG. 2, sufficient movement is obtained for the pipe end (not illustrated in FIG. 2) to be pressed firmly and tightly to the fitting.

As is also illustrated in FIG. 2, the openings 30 are arranged overlapping with a section of the outer thread 22 or 22a of the fitting 4 in each case when the holding element 16 is screwed onto the fitting 4. In other words, the openings 30 follow the inner thread 20 in the areas of the holding element 16, in which the inner thread is not formed. The advantage of this arrangement of the openings 30 is that even with a narrow wall thickness of the holding element 16 a sufficient depth for the hook wrench to engage is provided by the outer thread 22 or the indentation 22a arranged below the respective opening 30.

On the other hand, a latching nose 32 is formed on the outside of the fitting 4 and a recess 34 is formed on the side of the holding element 16 opposite the stop element 24. The latching nose 32 and the recess 34 are engaged with one another when the holding element 16 is fully screwed on the fitting 4 and secure the relative position of the holding element 16 with respect to the fitting 4. In order that the latching nose 32 can be initially overcome when the holding element 16 is being screwed on, before the latching nose 32 latches with the recess 34, the latching nose 32 has a chamfer 32a.

Eventually, the design of the holding element 16 together with the fitting 4 corresponds to a bayonet locking device with latching, so that in contrast to a conventional screw connection with a small pitch and many windings a rotation by 90° or up to 180° is sufficient to produce a firm and tight pipe connection. FIGS. 3 and 4 show an arrangement according to the invention in the pre-assembled starting position, i.e. with a partly screwed-on holding element 16 in the unpressed state. The pre-assembly can either be carried out at the factory or on site.

In contrast to the exemplary embodiment according to FIG. 1, the fitting 4 has an inner stop 40, so that the pipe end 8 can be inserted up to a predefined position in preparation for the assembly.

Furthermore, the fitting 4, in contrast to FIG. 1, only has one conically inwardly running section 26 which, first and foremost, brings about the radial pressing of the sealing ring 10. Another conical section is not provided, since the inner diameter of the opening of the distal end 6a is smaller than the largest outer diameter of the cutting ring 14. Since the outer contour of the cutting ring 14 runs conically, by sliding on the inner edge of the distal end 6a, a tapering of the cutting element during the axial movement radial pressing of the cutting ring 14 takes place.

In FIG. 3, compared to FIG. 1 one of the openings 30 can also be identified which is arranged overlapping with the indentation 22a of the outer thread 22 of the fitting 4 arranged radially inwardly below it.

FIG. 4 shows the same arrangement as FIG. 3 in a perspective view in the pre-assembled state. Here, it can be identified that one of the recesses 34, in the present case designated with 34a, in the starting position is partly engaged with the latching nose 32. Starting from this position, when the holding element 16 is being assembled rotation is in a clockwise direction, so that the edge 16a of the holding element 16 in the area of the recess 34 slides up the chamfer 32a, so that subsequently when the holding element 16 is rotated further the edge 16a slides over the latching nose 32.

Figure 5:
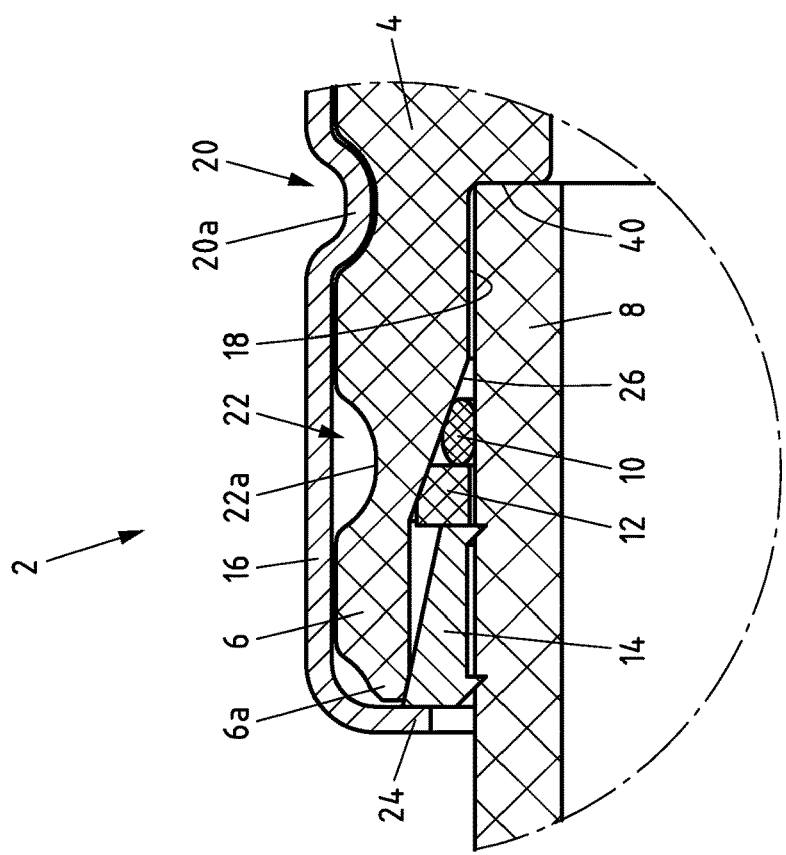

FIG. 5 shows the arrangement 2 in the pressed state after rotating the holding element 16 by a predefined angle, whereby an axial movement of the holding element 16 together with the three elements sealing ring 10, separating ring 12 and cutting ring 14 is brought about. Due to the conically inwardly running section 26 or the distal end 6a of the fitting 4, the elements 10, 12 and 14 are pressed against or into the material of the pipe end 8. In the process, the sealing ring 10 seals the pipe end 8 against the fitting 4, while the cutting ring 14 by partially penetrating the material of the pipe end 8 produces an axial fixed state, in particular against an extraction force.

Figure 6:
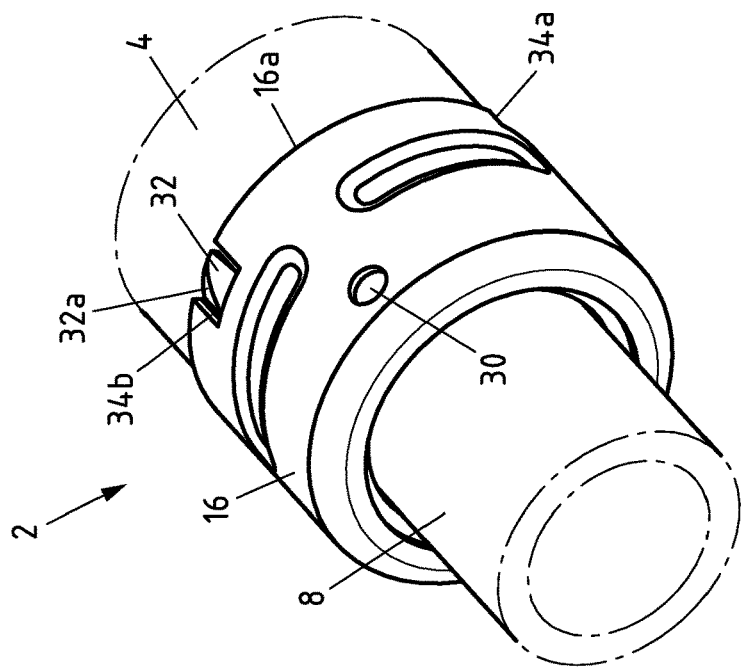
FIG. 5 shows the arrangement illustrated in FIG. 3 in the pressed end position in cross-section and FIG. 6 shows the arrangement from FIG. 5 in a perspective view.

FIG. 6 now shows the arrangement shown in FIG. 5 in a perspective view. The fitting 4 and the pipe end 8 have not been turned when screwing on the holding element 16 starting from the position illustrated in FIG. 4. The relative axial movement can be identified from the fact that the recess 34a can now be identified as rotated into another angular position, wherein another recess 34b is now engaged with the latching nose 32 due to the rotation of the holding element 16. It is noticeable that the edge 16a of the holding element 16 has been axially moved compared to FIG. 4 and the latching nose 32 is almost fully surrounded on three sides by the recess 34b. Thus, the end position of the holding element 16 relative to the fitting 4 is not only defined by the latching nose 32, but also secured.

The invention claimed is:

1. A pipe connection assembly, comprising:
a fitting,
an end section of the fitting for receiving a pipe end,
a sealing ring,
a separating ring,
a cutting ring and
a holding element,
wherein the fitting has an inner section with an inner diameter adapted to an outer diameter of the pipe end to be received,
wherein the end section has an inner contour tapered in sections starting from a distal end,
wherein the sealing ring, the separating ring and the cutting ring are arranged such that they are axially movable inside the end section of the fitting, and
wherein the holding element has an inner thread for screwing onto an outer thread formed on the fitting and a stop element protruding inwards for abutment against an arrangement of the sealing ring, the separating ring and the cutting ring,
wherein the holding element is produced by forming from a metal sheet, and
wherein the inner thread of the holding element is in sections formed as a circumferential indentation protruding inwards, wherein between said sections an otherwise cylindrical shape of the holding element is maintained.

2. The pipe connection assembly according to claim 1, wherein a wall thickness of the holding element is up to 5 mm.

3. The pipe connection assembly according to claim 1, wherein a material of the holding element is selected from a group consisting of structural steel, stainless steel, high-grade steel, copper, aluminum, and brass.

4. The pipe connection assembly according to claim 1, wherein the inner thread of the holding element is at least in sections formed as a circumferential indentation protruding inwards.

5. The pipe connection assembly according to claim 4, wherein the outer thread of the fitting is formed as a circumferential indentation.

6. The pipe connection assembly according to claim 4, wherein an axial width of the indentation is more than 1 mm.

7. The pipe connection assembly according to claim 1, wherein a pitch of the thread is steep enough such that after a rotation by 180°, an axial movement of the arrangement consisting of the sealing ring, the separating ring and the cutting ring is sufficient for a tight and stable connection to be produced between the pipe end and the fitting.

8. The pipe connection assembly according to claim 1, wherein the holding element has at least one opening for attaching a tool.

9. The pipe connection assembly according to claim 8, wherein the at least one opening is arranged overlapping with a section of the outer thread of the fitting when the holding element is screwed on.

10. The pipe connection assembly according to claim 1, wherein at least one latching nose is arranged on the outside of the fitting,
wherein at least one recess is arranged on a side of the holding element opposite the stop element, and
wherein the at least one latching nose and the at least one recess are engaged with one another when the holding element is fully screwed on.

* * * * *